United States Patent [19]

Minuto

[11] 3,803,077

[45] Apr. 9, 1974

[54] RESIN MOLDING COMPOSITION
[75] Inventor: Maurice Minuto, Huntington, N.Y.
[73] Assignee: Long Island Plastics Corporation, Farmingdale, N.Y.
[22] Filed: June 28, 1972
[21] Appl. No.: 267,154

[52] U.S. Cl. ... 260/30.8 R, 260/31.6, 260/31.8 DR, 260/31.8 AN, 260/31.8 G, 260/31.8 W, 260/33.4 R, 260/879
[51] Int. Cl. ............................................ C08f 45/48
[58] Field of Search ....... 260/879, 30.8 R, 31.8 DR, 260/31.8 AN, 31.8 G, 31.8 W, 31.6

[56] References Cited
UNITED STATES PATENTS
3,426,102 2/1969 Solak et al. .................... 260/80.7
3,533,979 10/1970 Minuto ...................... 260/31.8 DR

OTHER PUBLICATIONS

Rubber World–Materials & Compounding Ingredients for Rubber & Plastics (1965) (N.Y.), pages 263 & 329, TS1890I53.

*Primary Examiner*—Morris Liebman
*Assistant Examiner*—H. H. Fletcher

[57] ABSTRACT

A resin molding composition based on a nitrile rubber modified acrylonitrile-methyl acrylate copolymer and particularly suitable for forming bottles and containers of the beverage or other food containing type. The composition includes a multi-component additive which renders the basic resin readily subject to extrusion, blow molding, injection blow molding, injection molding and extrusion.

4 Claims, No Drawings

RESIN MOLDING COMPOSITION

BACKGROUND OF THE INVENTION

Molding resins of the nitrile rubber modified acrylonitrile-methyl acrylate copolymer type have been known for some time and are known to have a number of extremely advantageous properties such as forming bottles or containers therefrom which are particularly useful for containing carbonated beverages and other liquids as well as food products generally. Further products made from such known resins have a high impact value.

However, such known resins are difficult to mold since flow of resin is only obtained at extremely high temperatures. Under the circumstances it has been found that if the temperature is high enough to obtain flow of the resin, at such temperature the resin tends to break down. If the temperature is then reduced to prevent break down of the resin, then flow in the molding apparatus is insufficient to produce molded products in commercially feasible quantities.

Accordingly, an object of this invention is to provide an improved resin molding composition based on the nitrile rubber modified acrylonitrile-methyl acrylate copolymer, which includes an additive effective to lower molding temperatures to thereby avoid breakdown of the resin and to insure even flow of the resin to facilitate molding operations.

Another object of this invention is to provide a molding composition of the character described wherein the additive comprises (a) a toluene sulfonamide mixture and (b) a polyester plasticizer alone or in conjunction with ethylene glycol or 2,5 hexanediol.

The basic resin forming the molding composition of the instant invention is identified as a nitrile rubber modified acrylonitrile-methyl acrylate copolymer and consists of basic copolymers produced by the graft copolymerization of 73–77 parts by weight of acrylonitrile and 23–27 parts by weight of methyl acrylate in the presence of 8–10 parts by weight of butadiene-acrylonitrile copolymers containing approximately 70 percent by weight of polymer units derived from the butadiene.

It has been found that when 0.5 to 10.0 percent by weight of a multicomponent additive is mixed with 99.5 to 90.0 percent by weight of the aforesaid resin, a molding composition is produced which molds at temperatures which leave the resin unimpaired and which insures a uniform flow of resin in the molding apparatus.

Thus, the additive is constituted of a first mixture of ingredients, which mixture may be combined with one or more selected other ingredients. Thus, the first mixture of ingredients is made up of: 75 parts of a mixture of n-ethyl o- and p-toluene-sulfonamide, 20 parts of octylene glycol and 5 parts of Paraplex G-25 which is a soft, thermoplastic, high molecular weight polyester based on long chained polybasic acids esterified with polyhydric alcohols such as glycerol or ethylene glycol and including polypropylene glycol sebacate, by way of example.

The foregoing first mixture, made up of the indicated parts by weight, is hereinafter designated as the sulfonamide mixture.

The additive is further constituted of a product sold commercially by Monsanto Chemical Co. under the trademark SANTICIZER 409. Such product is essentially a polyester plasticizer derived from a dibasic acid and a glycol having an iodine No. of 0; APHA color 80; a pour point of 4° C.; a s.g. of 1.08 at 25° C; a flash point of 530° F and an acidity of 0.7 mg equivalent of potassium hydroxide per 100 grams.

Illustrative examples are as follows:

I.

70 percent by weight of the aforesaid first mixture based on the indicated sulfonamide, was admixed with 15 percent of SANTICIZER 409 and 15 percent of ethylene glycol, all by weight. 3.0 percent by weight of the resultant additive was mixed with 97.0 percent by weight of the nitrile rubber modified acrylonitrile-methyl acrylate copolymer.

The resin-additive mixture was molded in extrusion apparatus, extrusion blow molding apparatus, injection blow molding apparatus and injection molding apparatus at temperatures ranging from 370° F to 400° F. The mixture flowed evenly in each of the molding means and there was no resin breakdown or discoloration. Bottles molded from such compositions provided excellent containers for carbonated beverages and the like.

II.

90 percent by weight of the aforesaid first mixture based on the indicated sulfonamides was admixed with 10 percent by weight of SANTICIZER 409. 5 percent by weight of such additive was mixed with 95 percent by weight of the nitrile rubber modified resin mentioned above. The thus modified resin was readily molded at temperatures below 400° F and with good, uniform flow in the molds. Molded products showed high impact strength.

III.

80 percent by weight of the aforesaid first mixture based on the indicated sulfonamides, was admixed with 10 percent by weight of SANTICIZER 409 and 10 percent by weight of 2,5 hexanediol. 1.0 percent of the resultant additive was mixed with 99.0 percent of the nitrile rubber modified resin mentioned above. The product was readily molded at temperatures of from 370° to 390° F, with good flow in the molds and freedom from discoloration or resin breakdown. Molded products showed excellent impact strength as measured by the usual drop tests.

In example I, the sulfonamide content of the additive may range from 50 to 80 percent by weight, the SANTICIZER from 10 to 25 percent by weight and the ethylene glycol from 10 to 25 percent by weight. In example II, the sulfonamide mixture may range from 70 to 90 percent by weight and the SANTICIZER 409 from 10 to 30 percent by weight. In example III, the sulfonamide mixture may range from 60 to 80 percent by weight, the SANTICIZER 409 from 10 to 20 percent by weight and the 2,5 hexanediol from 10 to 20 percent by weight.

It is understood that the resin modified as described above may also include conventional additives such as filler, anti-oxidants, pigments and the like.

I claim:

1. A resin molding composition comprising 90.0 to 99.5 parts by weight of a nitrile rubber modified acrylonitrilemethyl acrylate copolymer, and 10.0–0.5 parts by weight of an additive, said additive comprising (a) a mixture of n-ethyl o- and p-toluene sulfonamides, octylene glycol and polypropylene glycol sebacate, and (b) a polyester plasticizer derived from a dibasic acid and a glycol having an iodine No. of 0, a pour point of 4° C, a s.g. of 1.08 at 25° C, a flash point of 530° F and an acidity of 0.7 mg. equivalent of potassium hydroxide per 100 grams, wherein in (a) said sulfonamide comprises 75 percent by weight, said octylene glycol comprises 20 percent by weight and said sebacate comprises 5 percent by weight; and wherein (a) comprises 70–90 percent by weight, and (b) comprises from 30–10 percent by weight.

2. A molding composition as in claim 1 wherein in (b) there are equal parts by weight of polyester plasticizer and ethylene glycol.

3. A molding composition as in claim 1, wherein (b) further includes 2,5 hexanediol.

4. A molding composition as in claim 1 wherein said additive comprises 3.0 percent by weight of said composition.

* * * * *